United States Patent
Takeuchi (10) Patent No.: US 9,709,423 B2
(45) Date of Patent: Jul. 18, 2017

(54) ELECTROMAGNETIC-INDUCTION-TYPE POSITION DETECTOR AND DETECTION METHOD

(71) Applicant: MITSUBISHI HEAVY INDUSTRIES MACHINE TOOL CO., LTD., Ritto-shi, Shiga (JP)

(72) Inventor: Katsuyoshi Takeuchi, Tokyo (JP)

(73) Assignee: MITSUBISHI HEAVY INDUSTRIES MACHINE TOOL CO., LTD., Shiga (JP)

(*) Notice: Subject to any disclaimer, the term of this patent is extended or adjusted under 35 U.S.C. 154(b) by 0 days.

(21) Appl. No.: 15/026,435

(22) PCT Filed: Oct. 16, 2014

(86) PCT No.: PCT/JP2014/077484
§ 371 (c)(1),
(2) Date: Mar. 31, 2016

(87) PCT Pub. No.: WO2015/093135
PCT Pub. Date: Jun. 25, 2015

(65) Prior Publication Data
US 2016/0216134 A1    Jul. 28, 2016

(30) Foreign Application Priority Data
Dec. 18, 2013 (JP) ................. 2013-261273

(51) Int. Cl.
*G01D 5/20* (2006.01)

(52) U.S. Cl.
CPC ............... *G01D 5/20* (2013.01); *G01D 5/206* (2013.01)

(58) Field of Classification Search
CPC  G01D 5/12; G01D 5/14; G01D 5/20–5/2291; G01B 7/00; G01B 7/003
See application file for complete search history.

(56) References Cited

U.S. PATENT DOCUMENTS

| 5,644,108 A | 7/1997 | Katsurahira et al. |
| 6,259,249 B1* | 7/2001 | Miyata ................... G01B 7/003 324/207.12 |

(Continued)

FOREIGN PATENT DOCUMENTS

| CN | 1121608 A | 5/1996 |
| CN | 102223046 A | 10/2011 |

(Continued)

OTHER PUBLICATIONS

English translation of the International Preliminary Report on Patentability and Written Opinion of the International Searching Authority (Forms PCT/IB/338, PCT/IB/373 and PCT/ISA/237), dated Jun. 30, 2016, for International Application No. PCT/JP2014/077484.

(Continued)

*Primary Examiner* — Alesa Allgood
*Assistant Examiner* — David Frederiksen
(74) *Attorney, Agent, or Firm* — Birch, Stewart, Kolasch & Birch, LLP (57) ABSTRACT

Provided are an electromagnetic-induction-type position detector which can be small sized and in which interference errors do not occur, and a detection method. The present invention has: a stator having first and second main patterns and first and second sub-patterns; and a rotor having a main pattern part and a sub-pattern part, in which adjacent comb-shaped electrodes of the main pattern part and the sub-pattern part are connected to form a single loop; and when an excitation electric current is supplied to the first and second main patterns, an excitation voltage excited in the main pattern part is detected in the first and second sub-patterns via the sub-pattern part, and when an excitation electric current is supplied to the first and second sub-patterns, the excitation voltage excited in the sub-pattern (Continued)

part is detected in the first and second main patterns via the main pattern part.

5 Claims, 6 Drawing Sheets

(56) References Cited

U.S. PATENT DOCUMENTS

| | | | |
|---|---|---|---|
| 2010/0321007 A1* | 12/2010 | Fukuda | G01D 5/2093 324/207.25 |
| 2011/0043196 A1* | 2/2011 | Fujita | G01D 5/2046 324/207.16 |
| 2011/0101968 A1* | 5/2011 | Brands | G01D 5/208 324/207.17 |
| 2012/0007592 A1* | 1/2012 | Manabe | G01D 5/2073 324/207.25 |
| 2013/0049741 A1* | 2/2013 | Kichise | G01D 5/2046 324/207.16 |
| 2013/0226510 A1 | 8/2013 | Ishii | |
| 2014/0132253 A1* | 5/2014 | Bertin | G01D 5/2086 324/207.17 |

FOREIGN PATENT DOCUMENTS

| | | |
|---|---|---|
| JP | 2000-180208 A | 6/2000 |
| JP | 2005-249730 A | 9/2005 |
| JP | 3806358 B2 | 8/2006 |
| JP | 2011-226874 A | 11/2011 |
| JP | 2011-226877 A | 11/2011 |
| JP | 2013-174521 A | 9/2013 |

OTHER PUBLICATIONS

International Search Report and Written Opinion of the International Searching Authority (Forms PCT/ISA/210, PCT/ISA/220 and PCT/ISA/237), dated Jan. 6, 2015, for International Application No. PCT/JP2014/077484, with a partial English translation.

Chinese Office Action and Search Report, dated Dec. 19, 2016, for Chinese Application No. 201480053235.5, together with an English translation thereof.

* cited by examiner

ELECTROMAGNETIC-INDUCTION-TYPE POSITION DETECTOR AND DETECTION METHOD

TECHNICAL FIELD

The present invention relates to an electromagnetic-induction-type position detector and a detection method which detect a position of a detection target by means of electromagnetic induction.

BACKGROUND ART

An inductosyn scale which is an electromagnetic-induction-type position detector is used as a position detection unit in various machines such as a machine tool, an automobile, and a robot. Inductosyn scales include a linear scale with a linear shape and a rotary scale with a rotary shape. The linear scale is, for example, a scale which is installed in a linear moving portion such as a linear moving shaft of a machine tool and which detects a linear movement position of the moving portion. The rotary scale is, for example, a scale which is installed in a rotating portion such as a rotary shaft of a machine tool and which detects a rotation position (rotation angle) of the rotating portion.

Figure 4A:
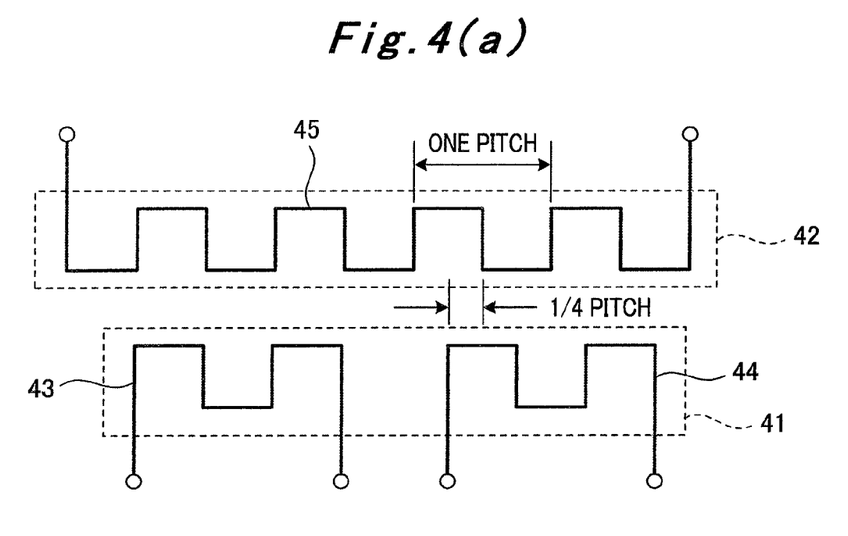
FIG. 4 includes views for explaining principles of a linear scale which is an electromagnetic-induction-type position detector, and part (a) is a view in which a slider and a scale of the linear scale are illustrated next each other, while part (b) of FIG. 4 is view illustrating a degree of electromagnetic coupling between the slider and the scale.
Figure 4B:
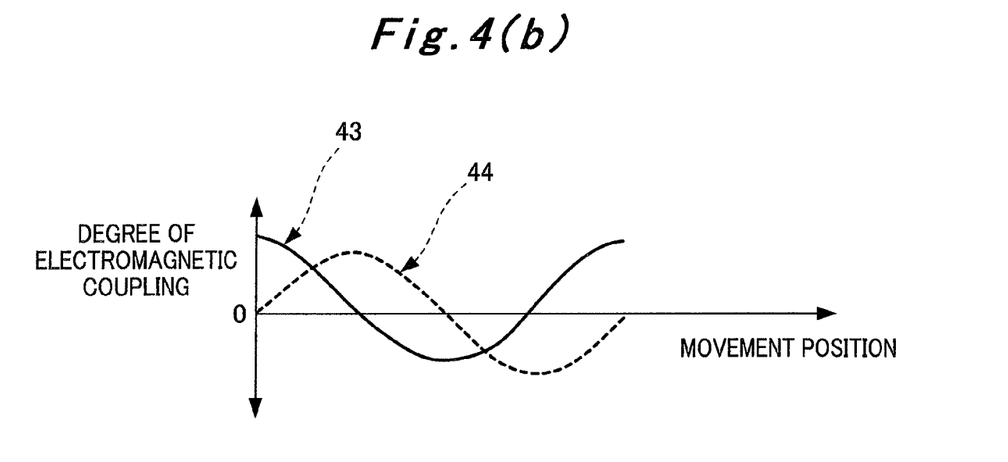

The linear scale and the rotary scale are both scales which detect the positions by means of electromagnetic induction of coil patterns arranged in parallel to face each other. Principles of this detection are described with reference to FIG. 4. Note that FIG. 4 includes views for explaining the principles of the linear scale, and part (a) of FIG. 4 is a view in which a slider and a scale of the linear scale are illustrated next each other, while part (b) of FIG. 4 is a view illustrating a degree of electromagnetic coupling between the slider and the scale. Although parts (a) and (b) of FIG. 4 are views illustrating the principles of the linear scale, principles of the rotary scale are the same as the principles of the linear scale, and a stator and a rotor of the rotary scale correspond to the slider and the scale of the linear scale, respectively.

As illustrated in part (a) of FIG. 4, a detection portion of the linear scale includes a slider 41 which is a primary-side plate member and a scale 42 which is a secondary-side plate member. In the linear scale, the slider 41 includes a first slider coil 43 which is a first primary-side coil and a second slider coil 44 which is a second primary-side coil. Moreover, the scale 42 includes a scale coil 45 which is a secondary-side coil. Each of these coils 43, 44, 45 is folded back and forth in a zigzag shape and is formed to have a linear shape as a whole.

The slider 41 (first slider coil 43 and second slider coil 44) and the scale 42 (scale coil 45) are arranged in parallel to face each other with a predetermined gap g maintained therebetween. Moreover, as illustrated in part (a) of FIG. 4, the position of the first slider coil 43 and the position of the first slider coil 44 are shifted from each other by a ¼ pitch (phases are shifted from each other by 90°), where one pitch of the scale coil 45 is the reference.

In the linear scale, an excitation current (alternating current) is made to flow through each of the first slider coil and the second slider coil 44. Then the degree of electromagnetic coupling between the scale coil 45 and each of the first slider coil 43 and the second slider coil 44 periodically changes as illustrated in part (b) of FIG. 4, depending on a change in a relative positional relationship between the scale coil 45 and each of the first slider coil 43 and the second slider coil 44 which is caused by the movement of the slider 41. Accordingly, an excitation voltage which periodically changes is generated in the scale coil 45.

An example of position detection is described. A first excitation current Ia as shown in the following formula (1) is made to flow through the first slider coil 43 and a second excitation current Ib as shown in the following formula (2) is made to flow through the second slider coil 44. Then an excitation voltage V as shown in the following formula (3) is generated in the scale coil 45 by electromagnetic induction between the scale coil 45 and each of the first slider coil 43 and the second slider coil 44. A peak amplitude Vp obtained by sampling the following formula (3) can be expressed as shown in the following formula (4).

$$Ia = -I \cdot \cos(k\alpha) \cdot \sin(\omega t) \quad (1)$$

$$Ib = I \cdot \sin(k\alpha) \cdot \sin(\omega t) \quad (2)$$

$$V = K(g) \cdot I \cdot \sin(k(X-\alpha)) \cdot \sin(\omega t) \quad (3)$$

$$Vp = K(g) \cdot I \cdot \sin(k(X-\alpha)) \quad (4)$$

In these formulae, "I" is the magnitude of the excitation current, "k" is $2\pi/p$, "p" is the length (angle in the rotary scale) of one pitch of the scale coil 45, "ω" is the angular frequency of the excitation current (alternating current), "t" is time, and "α" is the excitation position. Moreover, "K(g)" is the coupling coefficient depending on the strength of coupling in the gap g between the scale coil 45 and the pair of the first slider coil 43 and the second slider coil 44 and the like, and "X" is the displacement (movement position) of the scale.

By performing control such that the excitation position α follows the displacement X and Vp=0 is satisfied in the formula (4) described above, α=X is obtained as a detection position.

PRIOR ART DOCUMENT

Patent Document

Patent Document 1: Japanese Patent No. 3806358

SUMMARY OF THE INVENTION

Problems to be Solved by the Invention

Figure 5:
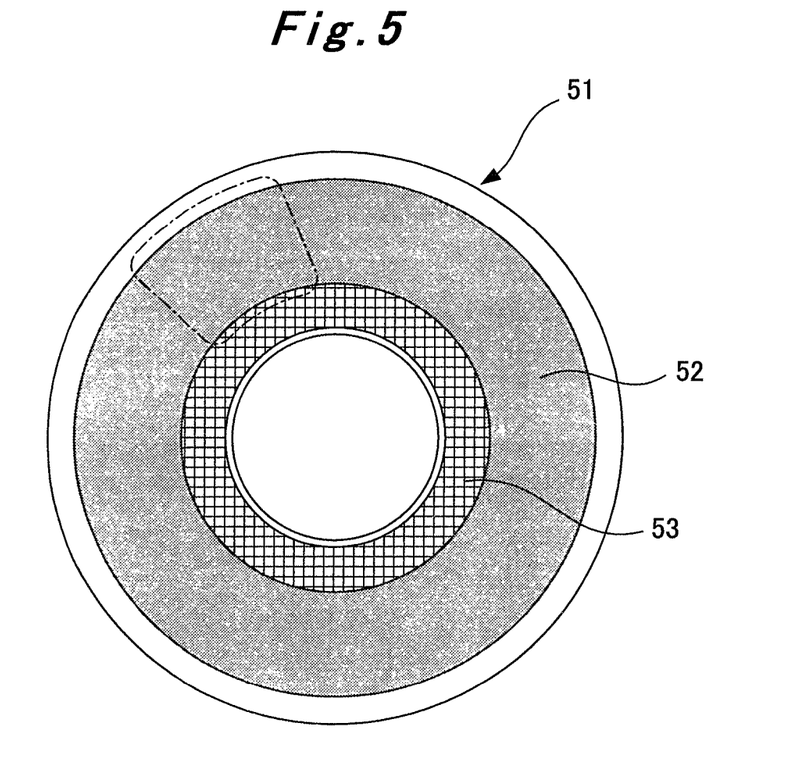
FIG. 5 is a plan view illustrating a rotor of a rotary scale which is an electromagnetic-induction-type position detector.

The rotary scale has a configuration including a stator corresponding to the slider of the linear scale and a rotor corresponding to the scale of the linear scale. As illustrated in FIG. 5, a scale pattern area 52 in which a scale coil is provided and a rotary transformer area 53 in which a rotary transformer is provided are arranged in a rotor 51 which is a movable portion of the rotary scale. The rotary transformer is required to contactlessly transmit the aforementioned excitation voltage V generated in the scale coil of the rotor 51 to the stator side. As described above, a space for providing the rotary transformer is required. However, in a small-diameter (small-size) rotary scale, it is difficult to secure a space for providing the rotary transformer. Even if there is such a space, an interference error occurs when the scale coil and the rotary transformer are arranged close to each other (the scale coil and the rotary transformer need to be spaced away from each other by 1 cm or more).

The present invention has been made in view of the problems described above, and an object thereof is to provide an electromagnetic-induction-type position detector and a detection method in which size reduction is possible and no interference error occurs.

Means for Solving the Problems

An electromagnetic-induction-type position detector of a first aspect of the invention for solving the problems described above is an electromagnetic-induction-type position detector which detects a position by using electromagnetic induction, comprising:

a primary-side plate member including a primary-side main pattern and a primary-side sub-pattern (which are arranged parallel to each other) each of which is formed of a planar coil pattern with comb-shaped poles arranged at a different pitch from that of the other pattern;

a secondary-side plate member including a secondary-side main pattern and a secondary-side sub-pattern (which are arranged parallel to each other) which are formed of planar coil patterns with comb-shaped poles arranged at different pitches, the secondary-side main pattern and the secondary-side sub-pattern formed in a loop by connecting each adjacent pair of the comb-shaped poles of the secondary-side main pattern and the secondary-side sub-pattern to each other; and a control unit configured to control switching of the primary-side main pattern and the primary-side sub-pattern to supply an excitation current to one of the primary-side main pattern and the primary-side sub-pattern and detect an excitation voltage flowing in the secondary-side main pattern or the secondary-side sub-pattern, from the other one of the primary-side main pattern and the primary-side sub-pattern, wherein the primary-side plate member and the secondary-side plate member are arranged to be opposed to each other such that the primary-side main pattern and the primary-side sub-pattern face the secondary-side main pattern and the secondary-side sub-pattern, respectively, and when the excitation current is supplied to the primary-side main pattern, the control unit detects the excitation voltage of the secondary-side main pattern excited by the excitation current of the primary-side main pattern, via the secondary-side sub-pattern by using the primary-side sub-pattern, and when the excitation current is supplied to the primary-side sub-pattern, the control unit detects the excitation voltage of the secondary-side sub-pattern excited by the excitation current of the primary-side sub-pattern, via the secondary-side main pattern by using the primary-side main pattern.

An electromagnetic-induction-type position detector of a second aspect of the invention for solving the problems described above is the electromagnetic-induction-type position detector of the first aspect of the invention, wherein the control unit includes:

a drive circuit configured to supply the excitation current to the primary-side main pattern or the primary-side sub-pattern;

a pickup circuit configured to detect the excitation voltage flowing through the secondary-side main pattern or the secondary-side sub-pattern by using the primary-side main pattern or the primary-side sub-pattern; and a switch unit configured to switch the drive circuit such that the drive circuit is connected to one of the primary-side main pattern and the primary-side sub-pattern and switch the pickup circuit such that the pickup circuit is connected to the other one of the primary-side main pattern and the primary-side sub-pattern, and when the excitation current is to be supplied to the primary-side main pattern, the control unit causes the switch unit to switch the drive circuit such that the drive circuit is connected to the primary-side main pattern and switch the pickup circuit such that the pickup circuit is connected to the primary-side sub-pattern, and detects the excitation voltage of the secondary-side main pattern excited by the excitation current, via the secondary-side sub-pattern by using the primary-side sub-pattern, and when the excitation current is to be supplied to the primary-side sub-pattern, the control unit causes the switch unit to switch the drive circuit such that the drive circuit is connected to the primary-side sub-pattern and switch the pickup circuit such that the pickup circuit is connected to the primary-side main pattern, and detects the excitation voltage of the secondary-side sub-pattern excited by the excitation current, via the secondary-side main pattern by using the primary-side main pattern.

An electromagnetic-induction-type position detector of a third aspect of the invention for solving the problems described above is the electromagnetic-induction-type position detector of the first or second aspect of the invention, wherein when the electromagnetic-induction-type position detector is a rotary electromagnetic-induction-type position detector including a rotor and a stator, the primary-side plate member is the stator, and the primary-side main pattern and the primary-side sub-pattern are each formed in an annular shape as a whole, and the secondary-side plate member is the rotor, and the secondary-side main pattern and the secondary-side sub-pattern are formed in an annular shape as a whole.

An electromagnetic-induction-type position detector of a fourth aspect of the invention for solving the problems described above is the electromagnetic-induction-type position detector of the first or second aspect of the invention, wherein when the electromagnetic-induction-type position detector is a linear electromagnetic-induction-type position detector including a slider and a scale, the primary-side plate member is the slider, and the primary-side main pattern and the primary-side sub-pattern are each formed in a linear shape as a whole, and the secondary-side plate member is the scale, and the secondary-side main pattern and the secondary-side sub-pattern are formed in a linear shape as a whole.

An electromagnetic-induction-type position detection method of a fifth aspect of the invention for solving the problems described above is a detection method using the electromagnetic-induction-type position detector of any one of the first to fourth aspect of the invention, wherein the primary-side main pattern includes a first primary-side main pattern and a second primary-side main pattern arranged such that a phase thereof is shifted from a phase of the first primary-side main pattern by 90°, the primary-side sub-pattern includes a first primary-side sub-pattern and a second primary-side sub-pattern arranged such that a phase thereof is shifted from a phase of the first primary-side sub-pattern by 90°, and the control unit supplies a first excitation current Ia shown in Math. 1 to the first primary-side main pattern or the first primary-side sub-pattern, and supplies a second excitation current Ib shown in Math. 1 to the second primary-side main pattern or the second primary-side sub-pattern to generate an excitation voltage V shown in Math. 1 in the secondary-side main pattern or the secondary-side sub-pattern, detects a first excitation voltage Vs shown in Math. 1 in the first primary-side sub-pattern or the first primary-side main pattern, and detects a second excitation voltage Vc shown in Math. 1 in the second primary-side sub-pattern or the second primary-side main pattern, shifts a phase of the second excitation voltage Vc by 90° and then combines the second excitation voltage Vc with the first excitation voltage Vs to derive a combined voltage Vg shown in Math. 1, and causes an excitation position α to follow a displacement X such that B=0 is satisfied in the combined voltage Vg, and thereby obtains α=X as a detection position, $Ia=-I\cdot\cos(k\alpha)\cdot\sin(\omega t)$ $Ib=I\cdot\sin(k\alpha)\cdot\sin(\omega t)$ $V=A\cdot\sin(\omega t)$ (provided that $A=Km\cdot I\cdot\sin(k(X-\alpha))$)

$Vs=B\cdot\sin\theta\cdot\sin(\omega t)$ $Vc=B\cdot\cos\theta\cdot\sin(\omega t)$ (provided that $B=Ks\cdot A=Ks\cdot Km\cdot I\cdot\sin(k(X-\alpha))$)

$Vg=B\cdot\cos(\omega t-\theta)$                [Math. 1]

I: the magnitude of the excitation current
k: 2π/p
p: the length or angle of one pitch in the secondary-side main pattern or the secondary-side sub-pattern
ω: the angular frequency of the excitation current
t: time
α: the excitation position
X: the displacement of the secondary-side main pattern or the secondary-side sub-pattern
Km: the coupling coefficient between the primary-side main pattern and the secondary-side main pattern
Ks: the coupling coefficient between the primary-side sub-pattern and the secondary-side sub-pattern
θ: the position (angle) of the secondary-side main pattern or the secondary-side sub-pattern.

Effect of the Invention

In the present invention, since no rotary transformer is required, the size of the detector can be reduced and no interference error occurs.

MODE FOR CARRYING OUT THE INVENTION

An embodiment of an electromagnetic-induction-type position detector and a detection method of the present invention is described with reference to FIGS. 1 to 3. Although the embodiment is described herein by giving an example of a rotary scale, the present invention can be applied also to a linear scale.

Embodiment 1

Figure 1:
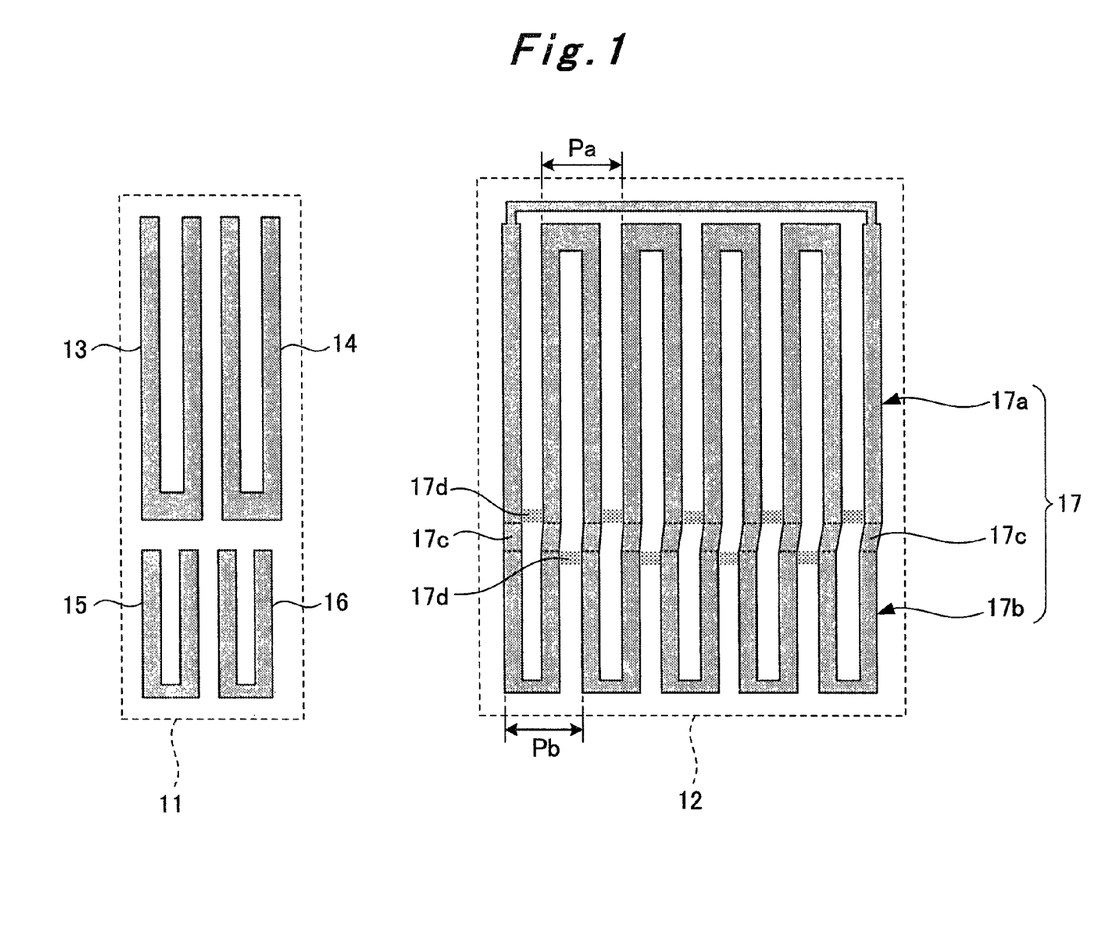
FIG. 1 is a plan view illustrating examples of a primary-side coil pattern and a secondary-side coil pattern of an electromagnetic-induction-type position detector as an embodiment of an electromagnetic-induction-type position detector and a detection method of the present invention.

FIG. 1 is a plan view illustrating examples of a primary-side coil pattern and a secondary-side coil pattern of a rotary scale which is the electromagnetic-induction-type position detector of the embodiment. Moreover, FIG. 2 is a plan view illustrating a configuration of the secondary-side coil pattern illustrated in FIG. 1 in a rotor. Furthermore, FIG. 3 is a view illustrating a circuit configuration used for the primary-side coil pattern and the secondary-side coil pattern illustrated in FIGS. 1 and 2.

First, an absolute value rotary scale which detects an absolute value of a rotation angle (absolute angle) is described with reference to FIG. 6 together with FIG. 5 described above. Note that FIG. 6 corresponds to a region surrounded by a one-dot chain line in FIG. 5.

Figure 6:
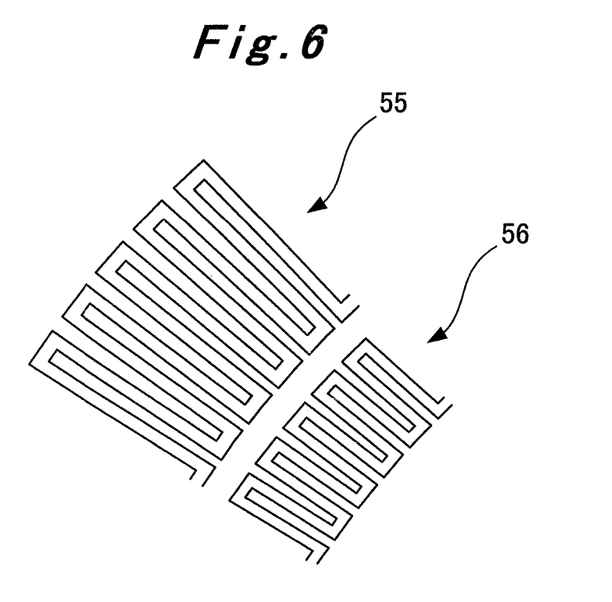
FIG. 6 is a plan view illustrating a secondary-side coil pattern in a rotor of an absolute value rotary scale which is an electromagnetic-induction-type position detector.

As partially illustrated in FIG. 6, a main pattern 55 and a sub-pattern 56 formed respectively of planar coil patterns are formed in a rotor of the absolute value rotary scale as a scale coil which is the secondary-side coil pattern, the planar coil patterns having different pitches (cycles) and each being folded back and forth in zigzag to have a comb shape. The main pattern 55 and the sub-pattern 56 are formed over the entire circumferences of circles on the same plane to have annular shapes as a whole. A main pattern and a sub-pattern formed respectively of planar coil patterns are formed in a stator in correspondence respectively to the main pattern 55 and the sub-pattern 56, as a slider coil which is the primary-side coil pattern, the planar coil patterns having different pitches and each being fold back and forth in zigzag to have a comb shape. The main pattern and the sub-pattern of the stator are formed over the entire circumferences of circles on the same plane to have annular shapes as a whole (illustration omitted).

Moreover, the rotor and the stator are arranged to be opposed to each other such that the main pattern 55 and the sub-pattern 56 forming the scale coil in the rotor face the main pattern and the sub-pattern forming the slider coil in the stator, respectively.

The principles of position detection (angle detection) are as described above, and the absolute angle of the rotor can be obtained from a difference between detection angles obtained respectively from the main pattern side and the sub-pattern side. In this case, voltage obtained from each of the main pattern side and the sub-pattern side is transmitted from the rotor side to the stator side via a rotary transformer as described above. Existence of this rotary transformer hinders the size reduction of the rotary scale.

As a result of studies by the inventors of the present invention, the inventors have made the following findings. In an absolute value rotary scale having a pair of main patterns and a pair of sub-patterns, the detection with the main patterns and the detection with the sub-patterns are performed separately. Accordingly, one of the pairs of patterns is in an unused state, and signal transmission can be performed by using the unused pair of patterns instead of a rotary transformer. Specifically, it is found that, when the detection is performed by using the main patterns, signals can be transmitted from the rotor side to the stator side by using the sub-patterns and, when the detection performed by using the sub-patterns, the signals can be transmitted from the rotor side to the stator side by using the main patterns.

However, in the configuration of the main pattern and the sub-pattern illustrated in FIG. 6, it is difficult to transmit signals by using the unused patterns. Accordingly, the configuration illustrated in FIG. 1 is employed as the configuration of the main pattern and the sub-pattern.

Specifically, as illustrated in FIG. 1, a scale pattern 17 in a rotor 12 (secondary-side plate member) includes: a main pattern portion 17a (secondary-side main pattern) formed of a planar coil pattern having multiple comb-shaped poles; a sub-pattern portion 17b (secondary-side sub-pattern) formed of a planar coil pattern having multiple comb-shaped poles arranged at a pitch different from that in the main pattern portion 17a; and multiple connection lines 17c. The main pattern portion 17a and the sub-pattern portion 17b are also folded back and forth in zigzag in square-U shapes in portions of the comb-shaped poles. In this embodiment, a pitch between the comb-shaped poles (angle of one comb-shaped pole) in the sub-pattern portion 17b is smaller than that in the main pattern portion 17a (pitch Pa>pitch Pb).

The pattern shape of the scale pattern 17 is as follows. The main pattern portion 17a is based on a main pattern in a conventional technique, and the sub-pattern portion 17b is also based on a sub-pattern in the conventional technique. Each adjacent pairs of the comb-shaped poles (square-U shaped portions in the conventional technique) of the main pattern portion 17a and the sub-pattern portion 17b arranged parallel to each other are connected by the connection line 17c, and the main pattern portion 17a and the sub-pattern portion 17b are thereby formed in a loop (line drawn with a single stroke) as a whole. Note that portions where patterns exist in the conventional technique (portions illustrated by dots) are denoted by reference sign 17d in FIG. 1 for reference.

As described above, the pitch Pa in the main pattern portion 17a is different from the pitch Pb in the sub-pattern portion 17b. Accordingly, although some of the connection lines 17c are each connected to be aligned with the corresponding line of the main pattern portion 17a and the corresponding line of the sub-pattern portion 17b in a straight line, most of the connection lines 17c are connected to be arranged obliquely to the lines of the main pattern portion 17a and the lines of the sub-pattern portion 17b.

Meanwhile a slider pattern in a stator 11 (primary-side plate member) includes, as in the conventional technique: a first main pattern 13 (first primary-side main pattern) and a second main pattern 14 (second primary-side main pattern) which correspond to the main pattern portion 17a in the rotor 12 and which are formed of planar coil patterns having multiple comb-shaped poles; and a first sub-pattern 15 (first primary-side sub-pattern) and a second sub-pattern 16 (second primary-side sub-pattern) which correspond to the sub-pattern portion 17b in the rotor 12 and which are formed of planar coil patterns having multiple comb-shaped poles arranged at a pitch different from that in the first main pattern 13 and the second main pattern 14. A pair of the first main pattern 13 and the second main pattern 14 and a pair of the first sub-pattern 15 and the second sub-pattern 16 are arranged parallel to each other. The first main pattern 13 and the first sub-pattern 15 are a first primary-side coil, while the second main pattern 14 and the second sub-pattern 16 are a second primary-side coil.

Moreover, the position of the first main pattern 13 and the position of the second main pattern 14 are shifted from each other by a ¼ pitch (phases are shifted from each other by 90°), where one pitch of the main pattern portion 17a is the reference. The position of the first sub-pattern 15 and the position of the second sub-pattern 16 are shifted from each other by a ¼ pitch (phases are shifted from each other by 90°), where one pitch of the sub-pattern portion 17b is the reference.

Furthermore, as in the conventional technique, the rotor 12 and the stator 11 are arranged to be opposed to each other such that the main pattern portion 17a of the scale pattern 17 in the rotor 12 and a pair of the first main pattern 13 and the second main pattern 14 in the stator 11 face each other, and such that the sub-pattern portion 17b of the scale pattern 17 in the rotor 12 and a pair of the first sub-pattern 15 and the second sub-pattern 16 in the stator 11 face each other.

The scale pattern 17 and the slider pattern described above can be each formed by using, for example, a printed circuit board. Since the first main pattern 13, the second main pattern 14, the first sub-pattern 15, and the second sub-pattern 16 forming the slide pattern are separate patterns and wiring thereof is performed individually, these patterns may be formed by using individual printed circuit boards.

Figure 2:
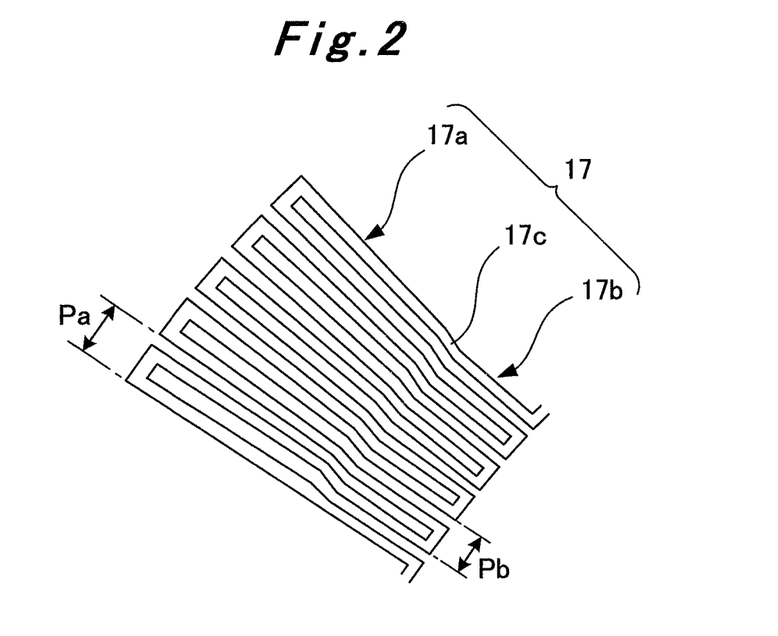
FIG. 2 is a plan view illustrating a configuration of the secondary-side coil pattern illustrated in FIG. 1 in a rotor.
Figure 3:
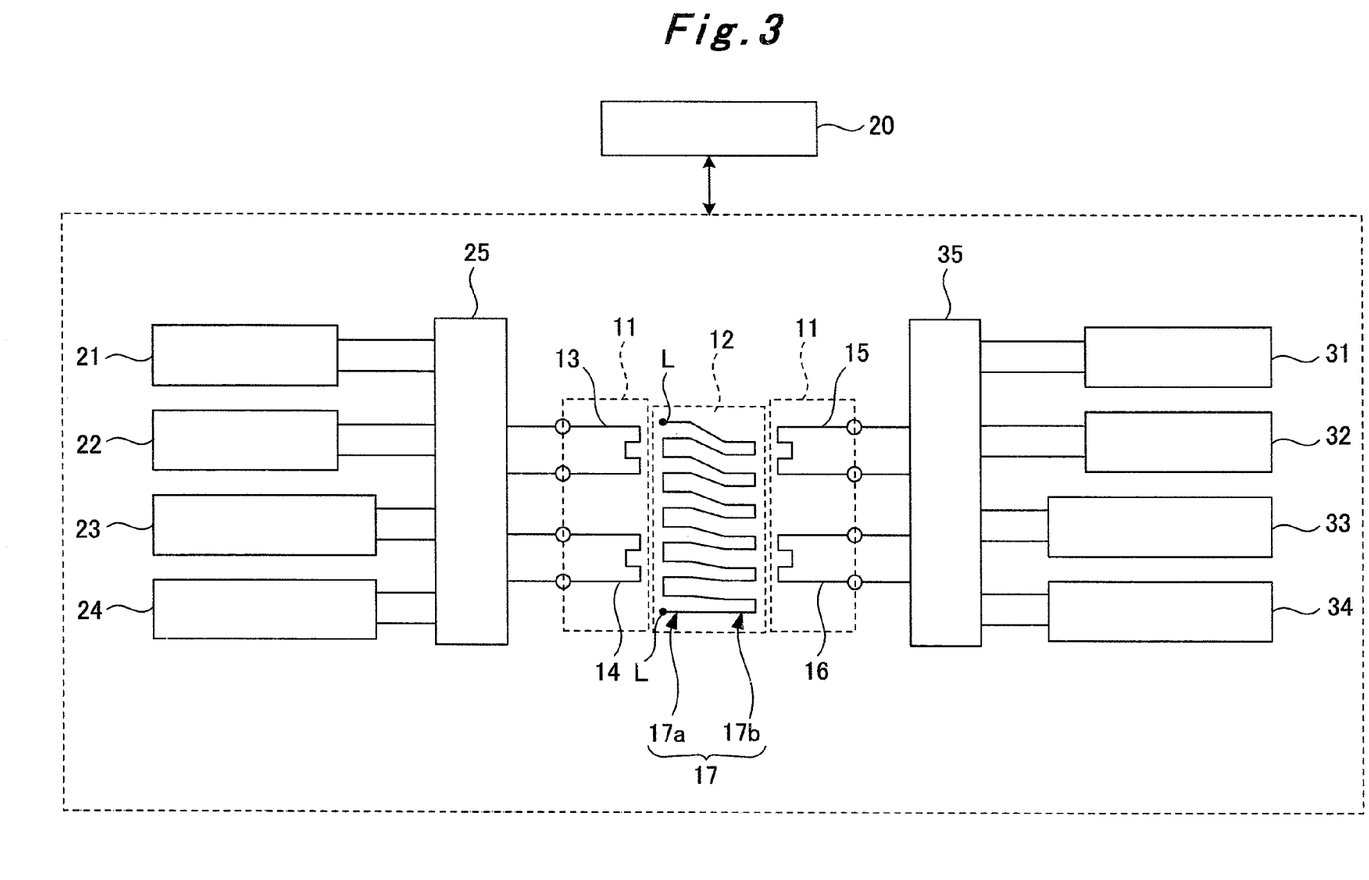
FIG. 3 is a view illustrating a circuit configuration used for the primary-side coil pattern and the secondary-side coil pattern illustrated in FIGS. 1 and 2.

In FIG. 1, although the entire shape of the scale pattern 17 is illustrated to be linear and have a short length for the sake of simplification of the drawing, in the rotary scale, the stator pattern 17 is formed in an annular shape as a whole to match the shape of the circular rotor 12 as partially illustrated in FIG. 2. This is the same for the slider pattern. In the case of using the patterns in a linear scale instead of the rotary scale, the shapes of the patterns may be like the shapes illustrated in FIG. 1.

Configuring the scale pattern 17 in the rotor 12 as illustrated in FIGS. 1 and 2 makes a rotary transformer completely unnecessary unlike in the conventional technique. Accordingly, it is possible to reduce the diameter of the rotor and resultantly reduce the size of the entire rotary scale. Moreover, since there is no rotary transformer, an interference error does not occur.

Next, a circuit configuration used for the aforementioned scale pattern 17 is described with reference to FIG. 3. Note that, although the scale pattern 17 is illustrated in FIG. 3 to be cut at end portions for the sake of convenience, connection points L are actually connected to each other and the scale pattern 17 is formed in a loop.

As described above, the rotary scale of the embodiment includes the first main pattern 13, the second main pattern 14, the first sub-pattern 15, and the second sub-pattern 16 in the stator 11, and includes the scale pattern 17 having the main pattern portion 17a and the sub-pattern portion 17b in the rotor 12.

Moreover, the rotary scale of the embodiment includes: a SIN drive circuit 21 which supplies an AC excitation current to the first main pattern 13; a COS drive circuit 22 which supplies an AC excitation current different from that of the SIN drive circuit 21 to the second main pattern 14; a SIN pickup circuit 23 which detects an excitation voltage of the scale pattern 17 by using the first main pattern 13; a COS pickup circuit 24 which detects the excitation voltage of the scale pattern 17 by using the second main pattern 14; and a switch unit 25 which performs switching of these circuits.

Furthermore, the rotary scale of the embodiment includes: a SIN drive circuit 31 which supplies an AC excitation current to the first sub-pattern 15; a COS drive circuit 32 which supplies an AC excitation current different from that of the SIN drive circuit 31 to the second sub-pattern 16; a SIN pickup circuit 33 which detects the excitation voltage of the scale pattern 17 by using the first sub-pattern 15; a COS pickup circuit 34 which detects the excitation voltage of the scale pattern 17 by using the second sub-pattern 16; and a switch unit 35 which performs switching of these circuits.

The switch unit 25 selects one of a pair of the SIN drive circuit 21 and the COS drive circuit 22 and a pair of the SIN pickup circuit 23 and the COS pickup circuit 24. Specifically, in the case of supplying the excitation currents (in a drive mode), the SIN drive circuit 21 and the COS drive circuit 22 are selected by the switch unit 25 to be electrically connected to the first main pattern 13 and the second main pattern 14, respectively. Moreover, in the case of detecting the excitation voltage (in a pickup mode), the SIN pickup circuit 23 and the COS pickup circuit 24 are selected by the switch unit 25 to be electrically connected to the first main pattern 13 and the second main pattern 14, respectively.

Similarly, the switch unit 35 also selects one of a pair of the SIN drive circuit 31 and the COS drive circuit 32 and a pair of the SIN pickup circuit 33 and the COS pickup circuit 34. Specifically, in the case of supplying the excitation currents (in the drive mode), the SIN drive circuit 31 and the COS drive circuit 32 are selected by the switch unit 35 to be electrically connected to the first sub-pattern 15 and the second sub-pattern 16, respectively. Moreover, in the case of detecting the excitation voltage (in the pickup mode), the SIN pickup circuit 33 and the COS pickup circuit 34 are selected by the switch unit 35 to be electrically connected to the first sub-pattern 13 and the second sub-pattern 14, respectively.

Furthermore, when the SIN drive circuit 21 and the COS drive circuit 22 are selected in the switch unit 25, the SIN pickup circuit 33 and the COS pickup circuit 34 are selected in the switch unit 35. Meanwhile, when the SIN drive circuit 31 and the COS drive circuit 32 are selected in the switch unit 35, the SIN pickup circuit 23 and the COS pickup circuit 24 are selected in the switch unit 25.

Specifically, when the excitation currents are supplied from the SIN drive circuit 21 and the COS drive circuit 22 selected in the switch unit 25 respectively to the first main pattern 13 and the second main pattern 14, the excitation voltage excited in the main pattern portion 17a of the scale pattern 17 by the supplied excitation currents is transmitted to the first sub-pattern 15 and the second sub-pattern 16 via the sub-pattern portion 17b of the scale pattern 17, and is detected by the SIN pickup circuit 33 and the COS pickup circuit 34 selected in the switch unit 35. This state is referred to as "main pattern excitation-sub-pattern detection."

Similarly, when the excitation currents are supplied from the SIN drive circuit 31 and the COS drive circuit 32 selected in the switch unit 35 respectively to the first sub-pattern 15 and the second sub-pattern 16, the excitation voltage excited in the sub-pattern portion 17b of the scale pattern 17 by the supplied excitation currents is transmitted to the first main pattern 13 and the second main pattern 14 via the main pattern portion 17a of the scale pattern 17, and is detected by the SIN pickup circuit 23 and the COS pickup circuit 24 selected in the switch unit 25. This state is referred to as "sub-pattern excitation-main pattern detection."

The aforementioned control and calculation described below are performed by a calculation control device 20.

Next, the control and calculation of the absolute position (absolute angle) in the rotary scale of the embodiment are described below. Although description is given herein of the case of the "main pattern excitation-sub-pattern detection", similar control and calculation are performed also in the case of the "sub-pattern excitation-main pattern detection."

(Step 1)

The excitation currents are supplied from the SIN drive circuit 21 and the COS drive circuit 22 selected in the switch unit 25 respectively to the first main pattern 13 and the second main pattern 14. Basically, as in the conventional technique, a first excitation current Ia as shown in the formula (1) described above is made to flow through the first main pattern 13, and a second excitation current Ib as shown in the formula (2) described above is made to flow through the second main pattern 14. Then, as in the formula (3) described above, an excitation voltage V as shown in the following formula (5) is generated in the main pattern portion 17a of the scale pattern 17 by electromagnetic induction between the main pattern portion 17a and the pair of the first main pattern 13 and the second main pattern 14.

$$V = A \cdot \sin(\omega t) \quad (5)$$

provided that $A = Km \cdot I \cdot \sin(k(X-\alpha))$ is satisfied, and "Km" is a coupling coefficient depending on the strength of coupling in a gap g between the main pattern portion 17a of the scale pattern 17 and the pair of first main pattern 13 and the second main pattern 14 and the like.

(Step 2)

The excitation voltage V excited in the main pattern portion 17a of the scale pattern 17 causes a current to flow through the sub-pattern portion 17b of the scale pattern 17, and excitation voltages are generated respectively in the first sub-pattern 15 and the second sub-pattern 16 by being excited by this current. These excitation voltages are detected respectively by the SIN pickup circuit 33 and the COS pickup circuit 34 selected in the switch unit 35, and can be expressed as shown in the following formulae (6) and (7), where Vs is the excitation voltage detected by the SIN pickup circuit 33 in the first sub-pattern 15 and Vc is the excitation voltage detected by the COS pickup circuit 34 in the second sub-pattern 16.

$$Vs = B \cdot \sin\theta \cdot \sin(\omega t) \quad (6)$$

$$Vc = B \cdot \cos\theta \cdot \sin(\omega t) \quad (7)$$

provided that $B = Ks \cdot A = Ks \cdot Km \cdot I \cdot \sin(k(X-\alpha))$ is satisfied, and "Ks" is a coupling coefficient depending on the strength of coupling in a gap g between the sub-pattern portion 17b of the scale pattern 17 and the pair of the first sub-pattern 15 and the second sub-pattern 16 and the like. Moreover, "θ" is the position (angle) of the scale pattern 17.

(Step 3)

In the calculation control device 20, a phase shift circuit (illustration omitted) provided in the calculation control device 20 shifts the phase of the excitation voltage Vc by 90°. Then the excitation voltage Vc can be expressed by the following formula (8).

$$Vc = B \cdot \cos\theta \cdot \cos(\omega t) \quad (8)$$

(Step 4)

When the excitation voltage Vs as shown in the formula (6) described above and the excitation voltage Vc as shown in the formula (8) described above are combined, the following formula (9) can be derived for a combined voltage Vg.

$$Vg = B \cdot \sin\theta \cdot \sin(\omega t) + B \cdot \cos\theta \cdot \cos(\omega t) = B \cdot \cos(\omega t - \theta) \quad (9)$$

(Step 5)

By performing control such that B=0 is satisfied in the formula (9) described above, specifically, by performing control such that an excitation position α follows a displacement X and B=0 is satisfied in B=Ks·A=Ks·Km·I·sin(k(X−α)), α=X is obtained as a detection position, and a main position Xm of the main pattern portion 17a of the scale pattern 17 is thereby obtained.

Also in the "sub-pattern excitation-main pattern detection," control and calculation similar to those in steps 1 to 5 described above are performed, and a sub-position Xs of the sub-pattern portion 17b of the scale pattern 17 is thereby obtained.

Then, the absolute position (absolute angle) of the rotor 11 can be obtained from a difference between the main position Xm and the sub-position Xs.

Although a case of the rotary scale is given as an example in this description, the circuit configuration (particularly, wiring) can be simplified in the case of a linear scale.

INDUSTRIAL APPLICABILITY

The present invention can be applied to a scale, an encoder, a magnetic sensor, an electromagnetic sensor, and the like.

EXPLANATION OF THE REFERENCE NUMERAL 11 stator
12 rotor
13 first main pattern
14 second main pattern
15 first sub-pattern
16 second sub-pattern
17 scale pattern
17a main pattern portion
17b sub-pattern portion
20 calculation control device
21, 31 SIN drive circuit
22, 32 COS drive circuit
23, 33 SIN pickup circuit
24, 34 COS pickup circuit
25, 35 switch unit

The invention claimed is:

1. An electromagnetic-induction-type position detector which detects a position by using electromagnetic induction, comprising:
   a primary-side plate member including a primary-side main pattern and a primary-side sub-pattern each of which is formed of a planar coil pattern with comb-shaped poles arranged at a pitch different from that of the other pattern;
   a secondary-side plate member including a secondary-side main pattern and a secondary-side sub-pattern which are formed of planar coil patterns with comb-shaped poles arranged at different pitches, the secondary-side main pattern and the secondary-side sub-pattern formed in a loop by connecting each adjacent pair of the comb-shaped poles of the secondary-side main pattern and the secondary-side sub-pattern to each other; and
   a control unit to control switching of the primary-side main pattern and the primary-side sub-pattern to supply an excitation current to one of the primary-side main pattern and the primary-side sub-pattern and detect an excitation voltage flowing in the secondary-side main pattern or the secondary-side sub-pattern, from the other one of the primary-side main pattern and the primary-side sub-pattern, wherein
   the primary-side plate member and the secondary-side plate member are arranged to be opposed to each other such that the primary-side main pattern and the primary-side sub-pattern face the secondary-side main pattern and the secondary-side sub-pattern, respectively, and
   when the excitation current is supplied to the primary-side main pattern, the control unit detects the excitation voltage of the secondary-side main pattern excited by the excitation current of the primary-side main pattern, via the secondary-side sub-pattern by using the primary-side sub-pattern, and
   when the excitation current is supplied to the primary-side sub-pattern, the control unit detects the excitation voltage of the secondary-side sub-pattern excited by the excitation current of the primary-side sub-pattern, via the secondary-side main pattern by using the primary-side main pattern.

2. The electromagnetic-induction-type position detector according to claim 1, wherein
   the control unit includes:
      a drive circuit configured to supply the excitation current to the primary-side main pattern or the primary-side sub-pattern;
      a pickup circuit configured to detect the excitation voltage flowing through the secondary-side main pattern or the secondary-side sub-pattern by using the primary-side main pattern or the primary-side sub-pattern; and
      a switch unit configured to switch the drive circuit such that the drive circuit is connected to one of the primary-side main pattern and the primary-side sub-pattern and switch the pickup circuit such that the pick circuit is connected to the other one of the primary-side main pattern and the primary-side sub-pattern, and
   when the excitation current is to be supplied to the primary-side main pattern, the control unit causes the switch unit to switch the drive circuit such that the drive circuit is connected to the primary-side main pattern and switch the pickup circuit such that the pickup circuit is connected to the primary-side sub-pattern, and detects the excitation voltage of the secondary-side main pattern excited by the excitation current, via the secondary-side sub-pattern by using the primary-side sub-pattern, and
   when the excitation current is to be supplied to the primary-side sub-pattern, the control unit causes the switch unit to switch the drive circuit such that the drive circuit is connected to the primary-side sub-pattern and switch the pickup circuit such that the pickup circuit is connected to the primary-side main pattern, and detects the excitation voltage of the secondary-side sub-pattern excited by the excitation current, via the secondary-side main pattern by using the primary-side main pattern.

3. The electromagnetic-induction-type position detector according to claim 1, wherein when the electromagnetic-induction-type position detector is a rotary electromagnetic-induction-type position detector including a rotor and a stator,
   the primary-side plate member is the stator, and the primary-side main pattern and the primary-side sub-pattern are each formed in an annular shape as a whole, and
   the secondary-side plate member is the rotor, and the secondary-side main pattern and the secondary-side sub-pattern are formed in an annular shape as a whole.

4. The electromagnetic-induction-type position detector according to claim 1, wherein when the electromagnetic-induction-type position detector is a linear electromagnetic-induction-type position detector including a slider and a scale, the primary-side plate member is the slider, and the primary-side main pattern and the primary-side sub-pattern are each formed in a linear shape as a whole, and the secondary-side plate member is the scale, and the secondary-side main pattern and the secondary-side sub-pattern are formed in a linear shape as a whole.

5. A detection method using the electromagnetic-induction-type position detector according to claim 1, wherein the primary-side main pattern includes a first primary-side main pattern and a second primary-side main pattern arranged such that a phase thereof is shifted from a phase of the first primary-side main pattern by 90°, the primary-side sub-pattern includes a first primary-side sub-pattern and a second primary-side sub-pattern arranged such that a phase thereof is shifted from a phase of the first primary-side sub-pattern by 90°, and the control unit supplies a first excitation current Ia according to Math. 1 to the first primary-side main pattern or the first primary-side sub-pattern and supplies a second excitation current Ib shown in Math. 1 to the second primary-side main pattern or the second primary-side sub-pattern to generate an excitation voltage V shown in Math. 1 in the secondary-side main pattern or the secondary-side sub-pattern, detects a first excitation voltage Vs according to Math. 1 in the first primary-side sub-pattern or the first primary-side main pattern and detects a second excitation voltage Vc shown in Math. 1 in the second primary-side sub-pattern or the second primary-side main pattern, shifts a phase of the second excitation voltage Vc by 90° and then combines the second excitation voltage Vc with the first excitation voltage Vs to derive a combined voltage Vg shown in Math. 1, and causes an excitation position $\alpha$ to follow a displacement X such that B=0 is satisfied in the combined voltage Vg, and thereby obtains $\alpha$=X as a detection position, wherein Math. 1 is defined as:

$Ia = -I \cdot \cos(k\alpha) \cdot \sin(\omega t)$ $Ib = I \cdot \sin(k\alpha) \cdot \sin(\omega t)$ $V = A \cdot \sin(\omega t)$ (provided that $A = Km \cdot I \cdot \sin(k(X-\alpha))$)

$Vs = B \cdot \sin\theta \cdot \sin(\omega t)$ $Vc = B \cdot \cos\theta \cdot \sin(\omega t)$ (provided that $B = Ks \cdot A = Ks \cdot Km \cdot I \cdot \sin(k(X-\alpha))$)

$Vg = B \cdot \cos(\omega t - \theta)$, wherein

I: the magnitude of the excitation current k: $2\pi/p$ p: the length or angle of one pitch in the secondary-side main pattern or the secondary-side sub-pattern $\omega$: the angular frequency of the excitation current t: time $\alpha$: the excitation position X: the displacement of the secondary-side main pattern or the secondary-side sub-pattern Km: the coupling coefficient between the primary-side main pattern and the secondary-side main pattern Ks: the coupling coefficient between the primary-side sub-pattern and the secondary-side sub-pattern $\theta$: the position (angle) of the secondary-side main pattern or the secondary-side sub-pattern.

* * * * *